United States Patent [19]

Hoxmeier

[11] Patent Number: 5,270,394

[45] Date of Patent: Dec. 14, 1993

[54] ANIONICALLY POLYMERIZED POLYMERS COUPLED WITH FULLERENES

[75] Inventor: Ronald J. Hoxmeier, Houston, Tex.

[73] Assignee: Shell Oil Company, Houston, Tex.

[21] Appl. No.: 956,184

[22] Filed: Oct. 5, 1992

[51] Int. Cl.$^5$ ............................................. C08F 297/04
[52] U.S. Cl. ..................... 525/232; 525/314; 525/332.5; 525/333.2; 525/333.3
[58] Field of Search ............. 525/63, 314, 232, 332.5, 525/333.3, 333.2

[56] References Cited

U.S. PATENT DOCUMENTS

| | | | |
|---|---|---|---|
| 4,014,844 | 3/1977 | Vidal et al. | 524/560 |
| 4,849,481 | 7/1989 | Rhodes et al. | 525/314 |
| 5,177,248 | 1/1993 | Chiang et al. | 560/86 |

FOREIGN PATENT DOCUMENTS

92/04279  3/1992  PCT Int'l Appl.

OTHER PUBLICATIONS

Fagan, Paul "Synthesis, Chemistry and Properties of a Monoalkylated Buckminsterfullerene Derivative, t--BuC$_{60}$ Anion" J. Am. Chem. Soc. 1992, 114, 9697-99.

Wudl, Fred "Chemical Properties of Buckminsterfullerene . . . " Acc. Chem. Res. 1992, 25, 157-161.

C$_{60}$: From Soot to Superconductors, Angew. Chem. Int. Ed. Engl. 30 (1991) No. 6.

*Diamagnetic Polyanions of the C$_{60}$ and C$_{70}$ Fullerenes: Preparation,* $^{13}$C *and Li NMR Spectroscopic Observation, and Alkylation with Methyl Iodide to Polymethylated Fullerenes,* J. Am. Chem. Soc. 1991, 113, 3205-3206.

*Chlorination and Bromination of Fullerenes. Nucleophilic Methoxylation of Polychlorofullerenes and Their Aluminum Trichloride Catalyzed Friedel-Crafts Reaction . . . ,* J. Am. Chem. Soc. vol. 113, No. 24, 1991.

Primary Examiner—James J. Seidleck
Assistant Examiner—Patrick R. Delaney
Attorney, Agent, or Firm—Donald F. Haas

[57] ABSTRACT

A process is described for producing a coupled polymer by anionically polymerizing monomers selected from the group consisting of a vinyl aromatic hydrocarbon, a conjugated diene or both with an organo alkali metal compound to produce living polymer arms which are then contacted with a fullerene which reacts with the living polymer arms to form a coupled polymer. The coupled polymer has a novel composition and novel characteristics.

10 Claims, No Drawings

ANIONICALLY POLYMERIZED POLYMERS COUPLED WITH FULLERENES

BACKGROUND OF THE INVENTION

As is well known, polymers containing both aromatic and ethylenic unsaturation can be prepared by copolymerizing one or more polyolefins, particularly a diolefin, with one or more alkenyl aromatic hydrocarbon monomers. Other diolefins such as 2,3-dimethyl-1,3-butadiene, 1,3-pentadiene, 1,3-hexadiene and the like, and other vinyl aromatic hydrocarbons such as o-methylstyrene, p-methylstyrene, p-tertbutylstyrene, 1,3-dimethylstyrene, alphamethyl-styrene, vinylnapthalene, vinylanthracene and the like may be used. The copolymers may, of course, be random, tapered, block or a combination of these. Radial and star polymers are also well known.

Polymers containing ethylenic unsaturation or both aromatic and ethylenic unsaturation may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

Polymers of conjugated diolefins, polymers of vinyl aromatic hydrocarbons and copolymers of one or more conjugated diolefins and one or more alkenyl aromatic hydrocarbon monomers such as ABA block copolymers, including radial and star versions, are frequently prepared in solution using anionic polymerization techniques. In general, when solution anionic techniques are used, these polymers are prepared by contacting the monomers to be polymerized simultaneously or sequentially with an organoalkali metal compound in a suitable solvent at a temperature within the range from about $-150°$ C. to about $300°$ C., preferably at a temperature within the range from about $0°$ C. to about $100°$ C. Particularly effective anionic polymerization initiators are organolithium compounds having the general formula:

$$RLi_n$$

Wherein: R is an aliphatic, cycloaliphatic, aromatic or alkyl-substituted aromatic hydrocarbon radical having from 1 to about 20 carbon atoms; and n is an integer of 1 to 4.

Such polymers are then often coupled to produce longer linear polymers or radial or star polymers by reacting the living polymer chains or arms with a polyfunctional coupling agent. This process is described in detail in U.S. Pat. No. 4,096,203 which is herein incorporated by reference. A well-known coupling agent for use in making star polymers is a polyalkenyl aromatic coupling agent, specifically divinyl benzene. The present invention provides an alternative coupling agent for use in producing such polymers.

SUMMARY OF THE INVENTION

The present invention is a process for producing a novel coupled polymer. The process comprises first anionically polymerizing a vinyl aromatic hydrocarbon, a conjugated diene or both with an organo alkali metal compound to produce living polymer arms. The living polymer arms are contacted with a fullerene which reacts with the living polymer arms, thereby forming a coupled polymer. Finally, the polymerization is terminated. The fullerenes known at the present time are Buckminsterfullerene, $C_{60}$, and $C_{70}$, $C_{76}$, $C_{84}$, $C_{90}$, $C_{94}$, $C_{100}$ and all the way up to $C_{212}$. The polymers produced exhibit novel characteristics.

DETAILED DESCRIPTION OF THE INVENTION

The polymers of the present invention are produced by anionic polymerization employing an organo alkali metal compound, usually an organo monolithium compound, as an initiator. The first step of the process involves contacting the monomer(s) to be polymerized with the organo monolithium compound (initiator) in the presence of an inert diluent thereby forming a living polymer compound having the simplified structure A-Li. The monomer may be a vinyl aromatic hydrocarbon, a conjugated diene or a mixture of the two. Styrene is the preferred vinyl aromatic hydrocarbon and the preferred dienes are butadiene and isoprene.

The inert diluent may be an aromatic or napthenic hydrocarbon, e.g., benzene or cyclohexane, which may be modified by the presence of an alkene or alkane such as pentenes or pentanes. Specific examples of suitable diluents include n-pentane, n-hexane, isoctane, cyclohexane, toluene, benzene, xylene and the like. The organomonolithium compounds (initiators) that are reacted with the polymerizable additive in this invention are represented by the formula a RLi, wherein R is an aliphatic, cycloaliphatic, or aromatic radical, or combinations thereof, preferably containing from 2 to 20 carbon atoms per molecule. Exemplary of these organomonolithium compounds are ethyllithium, n-propyllithium, isopropyllithium, n-butyllithium, sec-butyllithium, tertoctyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-heptylcyclohexyllithium, 4-cyclopentylbutyl-lithium, and the like. The alkyllithium compounds are preferred for employment according to this invention, especially those wherein the alkyl group contains from 3 to 10 carbon atoms. A much preferred initiator is sec-butyllithium. See U.S. Pat. No. 3,231,635 which is herein incorporated by reference. The concentration of the initiator can be regulated to control molecular weight. Generally, the initiator concentration is in the range of about 0.25 to 50 millimoles per 100 grams of monomer although both higher and lower initiator levels can be used if desired. The required initiator level frequently depends upon the solubility of the initiator in the hydrocarbon diluent. These polymerization reactions are usually carried out at a temperature in the range of $-60°$ to $+300°$ F. and at pressures which are sufficient to maintain the reaction mixture in the liquid phase.

The living polymer arms may be homopolymers or block, random or tapered block copolymers of one or more of the above monomers. For instance, the living polymer arm may consist of a block of polystyrene and/or a block of a conjugated diene or it may consist of blocks of different conjugated dienes. Blocks containing more than one monomer are made by first anionically polymerizing the first monomer to make a living polymer arm and then continuing the polymerization in the presence of the second monomer, thereby forming a living polymer arm which is comprised of blocks of each of the monomers.

The living polymer arms are then reacted with a fullerene to produce a coupled polymer. The coupling reaction may be carried out in the same solvent as for the polymerization reaction steps for convenience or it may be added as a solid. A list of suitable solvents includes toluene aromatic solvents, ether, tetrahydrofuran and ethers in general. The coupling reaction step temperature may vary between wide limits, for example, from 0° C. to 150° C., preferably from 50° C. to 80° C. The reaction may also take place in an inert atmosphere (no oxygen), for example, nitrogen and under pressure, for example, a pressure of from 1 atm to 100 atm. However, very good results may be achieved at ambient conditions.

Fullerenes are highly stable molecules composed of a large number of carbon atoms. In 1985, Kroto et al. reported in *Nature*, Volume 318, p. 162, Nov. 14, 1985, that stable clusters of 60 and 70 carbon atoms could be produced. The model proposed for the 60 carbon cluster was a truncated icosahedron composed of 32 faces, 12 pentagonal and 20 hexagonal, which looks somewhat like a soccer ball and is similar to the geodesic domes of Buckminster Fuller. Thus, $C_{60}$ is commonly referred to as Buckminster-fullerene.

These fullerenes, the $C_{60}$ and $C_{70}$ fullerenes, can be made by evaporating graphite in an atmosphere of an inert quenching gas under pressure in an evacuated reactor, collecting the quenched carbon product and contacting it with an extracting non-polar organic solvent under conditions to separate the $C_{60}$ and $C_{70}$ compounds therefrom. The process is described in detail in World Patent Application WO 92/04279, published Mar. 19, 1992, and based on U.S. patent applications Ser. Nos. 575,254 and 580,246, filed Aug. 30, 1990 and Sep. 10, 1990, respectively (these patent applications are hereby incorporated by reference). Other fullerenes, such as $C_{76}$, $C_{84}$, $C_{90}$, $C_{94}$, $C_{100}$ and up to $C_{212}$, have also been discovered as described in "$C_{60}$: From Soot to Superconductors" by F. Diederich and R. L. Whetten, *Angew. Chem. Int. Ed. Engl.* 30 (1991) No. 6, pp. 678–680, which is also herein incorporated by reference.

The polymers made by this coupling reaction will generally be star shaped polymers because of the large number of active coupling sites which are present on the fullerene compounds. The number of polymer arms will generally vary from about 3 to about 36 arms. However, it is possible to produce polymers with lesser numbers of arms and even substantially linear polymers and polymers with more than 36 arms. All of these polymers are characterized by having a dense center or nucleus of the fullerene compound and a number of arms of linear unsaturated polymers extending outward therefrom.

Following the coupling reaction, the product is neutralized such as by addition of terminators, e.g., hydrogen, water, alcohol, $Ni^{+2}$, methyl iodide or other reagents, for the purpose of removing the lithium radical forming the nucleus for the condensed polymer product. The product is then removed such as by coagulation utilizing hot water, steam, methanol, isopropanol, etc.

After coupling of the first set of polymer arms, it is possible to make another set of polymer arms by anionic polymerization, preferably different from the first set, and react the second set of polymer arms with the first coupled product before, or preferably after, termination to produce a second coupled product which is an asymmetric star polymer. An asymmetric star polymer is a star polymer in which not all of the arms have the same polymeric structure. It is significant that the efficacy of the fullerene coupling agent is not adversely affected by the termination step. Of course, such asymmetric polymers could also be produced by making a second set of polymer arms before coupling and then coupling both the first and second set of polymer arms with the fullerene at the same time.

Preferred coupled polymers made according to the process of the present invention include star polymers of polystyrene, polybutadiene and polyisoprene. Preferred polymers made according to the present invention include star block copolymers wherein the polymer arms are block copolymers of styrene and either butadiene or isoprene and asymmetric block copolymers which have additional blocks of either polybutadiene or polyisoprene.

The molecular weights of polymers produced hereunder may vary over a wide range with individual arm molecular weights varying from 500 to 500,000. Molecular weights of linear polymers or unassembled linear segments of polymers such as mono-, di-, triblock, and etc., arms of star polymers before coupling are conveniently measured by Gel Permeation Chromatography (GPC), where the GPC system has been appropriately calibrated. Polymers of known molecular weight are used to calibrate and these must be of the same molecular structure and chemical composition as the unknown linear polymers or segments that are to be measured. For anionically polymerized linear polymers, the polymer is essentially monodisperse and it is both convenient and adequately descriptive to report the "peak" molecular weight of the narrow molecular weight distribution observed. Measurement of the true molecular weight of the final coupled star polymer is not as straightforward or as easy to make using GPC. This is because the star shaped molecules do not separate and elute through the packed GPC columns in the same manner as do the linear polymers used for the calibration, and, hence, the time of arrival at a UV or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modern Size-Exclusion Liquid Chromatography*, M. W. Yau, J. J. Kirkland, D. D. Bly, John Wiley & Sons, New York, N.Y., 1979.

2. *Light Scattering from Polymer Solutions*, M. B. Huglin, ed., Academic Press, New York, N.Y. 1972.

3. W. Kay and A. J. Havlik, *Applied Optics*, 12, 541 (1973).

4. M. L. McConnell, *American Laboratory*, 63, May 1978.

If desired, these block copolymers can be hydrogenated. Hydrogenation may be effected selectively as disclosed in U.S. Pat. No. Re: 27,145 or 5,039,755 which are herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts and titanium catalysts.

As initially prepared, the coupled block copolymer versions of $C_{60}$ are strong, elastomeric and very soluble in hydrocarbon solvents. Upon storing a cast film in the dark for several weeks at ambient conditions, the material at first becomes insoluble in hydrocarbon solvents (gel formation indicating crosslinking) and ultimately extremely brittle to the point of shattering upon application of impact. This suggests that the $C_{60}$ coupling agent core is an efficient generator of free-radicals and thereby serves as a built-in vulcanization agent. This is an extremely novel composition with corresponding novel properties and uses, e.g., in adhesives and asphalt modification applications.

The polymers made according to the present invention can be used for all of the uses known for such polymers made by other methods with other coupling agents such as dibromoethane and divinyl benzene. For example, such polymers can be used in adhesives, coatings, sealants, and blends with other thermoplastics, as viscosity index improvers, in asphalt blends and as potentially extrudable or moldable electrically conducting, semiconducting or superconducting systems.

EXAMPLE 1

These experiments demonstrate the coupling of homopolymer arms with $C_{60}$.

In the first step, living polybutadiene arms (PBD$^-$Li$^+$) of 5,000 molecular weight (as determined by gel permeation chromatography [GPC]) were prepared by adding the appropriate amount of cyclohexane solvent to a 100 ml bottle reactor, charging the reactor with the appropriate amount of butadiene and then adding the required amount of sec-butyl lithium in cyclohexane solution. The reactor was heated in a water bath at 50° C. for 1.5 hours and then cooled. The appropriate amount of Buckminsterfullerene (known colloquially as "Bucky Balls"), $C_{60}$, was added to the reactor as a solid in a drybox and the reactor was heated again for an hour and a half at 70° C. Upon addition of the Bucky Balls, the color of the solution became dark red. The polymerizations were terminated as described below and after precipitating the polymer with methanol, the polymers were dried in an oven at 50° C. with a purge of nitrogen. The resulting polymers were analyzed by GPC. For all of these experiments Li:$C_{60}$=6:1 on a molar basis. Three experiments (Bucky 1-3) were coupled as described above. A second set of experiments (Bucky 4-6) were coupled in the presence of N,N,N',N'-tetramethylethylenediamine (TMEDA). In Bucky 4-6, TMEDA:Li=2:1 on a molar basis. The reactions were terminated with various reagents as shown in Table 1. Ni$^{+2}$ was added as Ni(2-ethylhexanoate)$_2$ in cyclohexane. Six polymers were made and the amounts of the reactants are shown in Table 1 below.

TABLE 1

| Polymer | Bucky 1 | Bucky 2 | Bucky 3 | Bucky 4 | Bucky 5 | Bucky 6 |
|---|---|---|---|---|---|---|
| Cyclohexane, g. | 50.7 | 47.6 | 44.9 | 46.8 | 46.9 | 43.6 |
| Butadiene, g. | 5.4 | 5.2 | 4.90 | 4.80 | 5.90 | 5.20 |
| S-BuLi, mg | 64 | 64 | 64 | 64 | 64 | 64 |
| Bucky Balls, mg | 120 | 120 | 120 | 120 | 120 | 120 |
| Termination Agent | Acetic Acid | Ni$^{+2}$ | MeI | Acetic Acid | Ni$^{+2}$ | MeI |

The GPC analysis revealed that the coupling efficiencies of Buckys 1, 2 and 3 were 30%, 48% and 60% respectively and the coupling efficiencies of Buckys 4, 5 and 6 were 30%. This was carried out by comparing the GPC traces obtained using a refractive index detector and a UV detector for each sample. Only those species containing Bucky Balls give a UV signal in the GPC trace. This means that 30% to 60% of the polybutadiene was coupled to the Buckminsterfullerene coupling agent. The number of arms was estimated to vary from one to 20 or more arms.

EXAMPLE 2

These experiments demonstrate the coupling of block copolymer arms with $C_{60}$.

Styrene-butadiene diblock arms (SB$^-$Li$^+$) of 5,000 and 10,000 molecular weight, respectively, were made by first making a polystyrene block and then adding a polybutadiene block thereto. A block of 5,000 molecular weight polystyrene was made by adding styrene and s-butyllithium to a reactor charged with cyclohexane and 6% by weight diethyl ether to insure that the 1,2 vinyl content of the polybutadiene block was at least 40%. An orange solution resulted and the solution was heated in a water bath at 50° C. for 1.5 hours and then allowed to cool to room temperature. Then butadiene was added to the reactor which was then heated for another hour at 50° C. resulting in a pale yellow solution. This solution was contacted with Bucky Balls (added as solid $C_{60}$ for Bucky 7 and 0.4% wt solution of $C_{60}$ in toluene for Bucky 8) and then coupled, terminated and coagulated as described for Bucky 1 in Example 1. The amounts of the various materials used are shown in Table 2 below (the ratio of Li:$C_{60}$ was 6:1 on a molar basis for both experiments).

TABLE 2

| | Wt. of CH | Wt. of Ether | Wt. of Sty. | Wt. of BD | Wt. of S-BuLi | Wt. of $C_{60}$ |
|---|---|---|---|---|---|---|
| Bucky 7 | 46.3 | 3.1 g | 1.85 g | 3.6 g | 21 mg | 40 mg |
| Bucky 8 | 46.0 | 3.6 g | 1.70 g | 3.3 g | 21 mg | 40 mg |

The polymers produced herein, Bucky 7 and Bucky 8, were shown to be 78% and 66% coupled, respectively, by GPC analysis as described in Example 1. The number of arms grafted to $C_{60}$ are estimated to vary from 1 to about 10 in these experiments.

EXAMPLE 3

These experiments demonstrate that, after one set of arms is coupled to $C_{60}$, another set of arms can be coupled to the initially coupled species thereby greatly increasing the total number of arms coupled to $C_{60}$.

Styrene-butadiene arms (SB$^-$Li$^+$) of 5000 and 10,000 molecular weight respectively were prepared exactly as in Example 2. Three identical solutions were prepared for Experiments Bucky 9, Bucky 10 and Bucky 11, respectively. Then, to Bucky 9, e.g., was added sufficient Bucky 4 (from Example 1) to give a Li:$C_{60}$ molar ratio of 7:1. Thus, Bucky 4 already containing a number of arms grafted to $C_{60}$ is used as the coupling agent in this experiment to add yet additional arms to form an asymmetric radial polymer. Likewise, to Bucky 10 was added Bucky 5 as coupling agent and to Bucky 11 was added Bucky 6 as coupling agent. The results are shown in Table 3 below. Note that the coupling agents have the composition (polybutadiene)$_n$$C_{60}$=$B_n$$C_{60}$; the arms to be coupled have the composition polystyrenepolybutadiene $^-$Li$^+$=SB$^-$Li$^+$; and thus the products of the coupling reactions are (SB)$_m$$B_n$$C_{60}$.

TABLE 3

| Experiment No. | Coupling Agent = $B_n C_{60}$ | Coupling Efficiency | Product |
|---|---|---|---|
| Bucky 9 | Bucky 4 | 35% | (SB)$_m$$B_n$$C_{60}$ |
| Bucky 10 | Bucky 5 | 33% | (SB)$_m$$B_n$$C_{60}$ |
| Bucky 11 | Bucky 6 | 16% | (SB)$_m$$B_n$$C_{60}$ |

As described in Examples 1 and 2, coupling efficiencies were determined from GPC analysis. The coupling efficiency was defined as being equal to the ratio of coupled SB$^-$Li$^+$ arms to the total number of SB$^-$Li$^+$ arms *available* for coupling.

EXAMPLE 4

Synthesis of (polystyrene)$_n$$C_{60}$=$S_n$$C_{60}$ for determination of the *average* number of coupled arms in $S_n$$C_{60}$.

Polystyryllithium (S$^-$Li$^+$) of 10,000 mole weight was prepared by techniques identical to those described in Example 1 and then coupled by adding solid $C_{60}$. Thus, to 0.5 mmoles of S$^-$Li$^+$ in cyclohexane (10% by wt S$^-$Li$^+$) was added 0.083 mmoles of $C_{60}$ (Li:$C_{60}$=6:1 on a molar basis). This solution was coupled at 70° C. for 1 hour to give Bucky 12. GPC analysis indicated that Bucky 12 was 56% coupled. This material was analyzed by light scattering techniques to obtain the average molecular weight from which it was determined that the average number of arms coupled to $C_{60}$ in Bucky 12 is 14 arms/$C_{60}$ molecule.

I claim:

1. A process for producing a coupled polymer which comprises:
   (a) anionically polymerizing monomers selected from the group consisting of a vinyl aromatic hydrocarbon, a conjugated diene or both with an organo alkali metal compound to produce living polymer arms,
   (b) contacting the living polymer arms with a fullerene which reacts with the living polymer arms, thereby forming a coupled polymer, and
   (c) terminating the polymerization.

2. The process of claim 1 wherein the coupling reaction of step (b) is carried out at a temperature of from about 0° C. to about 150° C.

3. The process of claim 1 wherein the living polymer arms made in step (a) comprise blocks of at least two different monomers.

4. The process of claim 1 wherein after step (a) but before step (b), anionically polymerizing monomers different from those of step (a) and selected from the group consisting of a vinyl aromatic hydrocarbon, a conjugated diene or both with an organo alkali metal compound to produce a second set of living polymer arms, wherein the polymer arms from step (a) and the second set of polymer arms are coupled in step (b) to produce an asymmetric polymer.

5. The process of claim 1 wherein the following additional steps are added after step (c):
   (d) anionically polymerizing monomers different from those of step (a) and selected from the group consisting of a vinyl aromatic hydrocarbon, a conjugated diene or both with an organo alkali metal compound to produce living polymer arms,
   (e) contacting the living polymer arms of step (d) with the coupled and terminated polymer of step (c) wherein the living polymer arms of step (d) react with the fullerene and form an asymmetric coupled polymer, and
   (f) terminating the polymerization.

6. The process of claim 1 wherein the organo alkali metal compound is a hydrocarbon lithium compound.

7. The process of claim 6 wherein the hydrocarbon lithium compound is sec-butyl lithium.

8. The process of claim 1 wherein the coupled polymer is hydrogenated.

9. The process of claim 4 wherein the coupled polymer is hydrogenated.

10. The process of claim 5 wherein the coupled polymer is hydrogenated.

* * * * *